W. J. WRIGHT.
INTERNAL COMBUSTION ENGINE.
APPLICATION FILED JAN. 11, 1909.
1,076,854.
Patented Oct. 28, 1913.
6 SHEETS—SHEET 4.
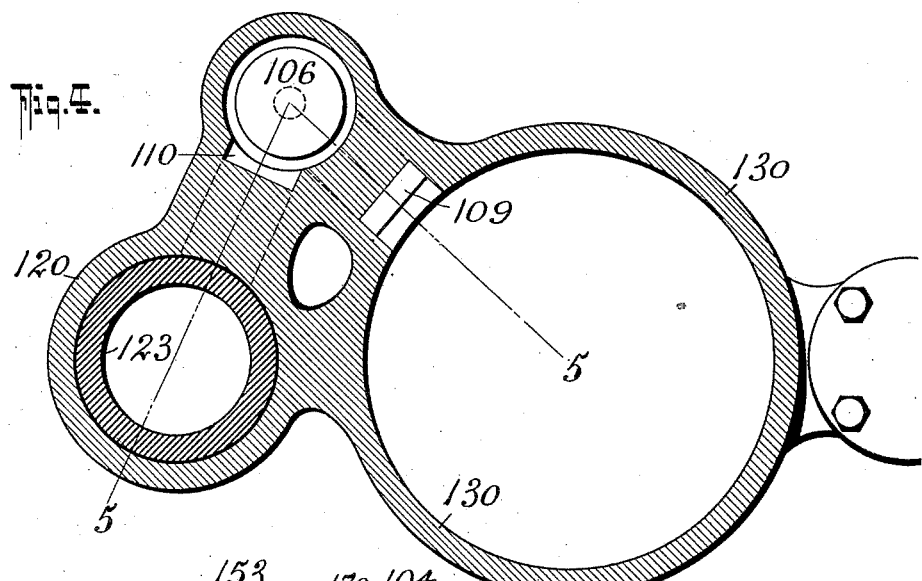
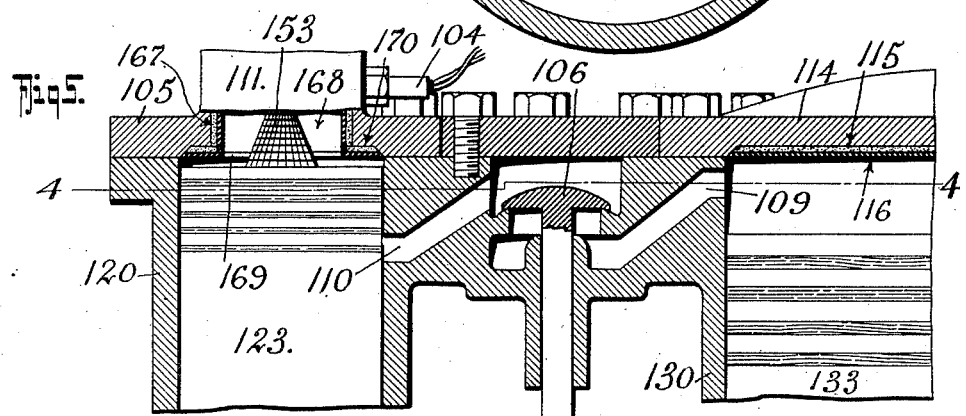
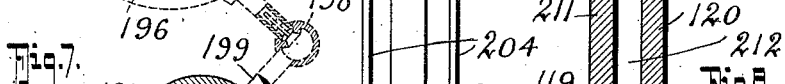
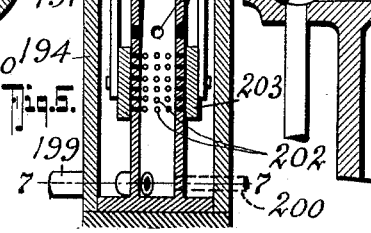
INVENTOR
William J. Wright
BY
Fred G. Dieterich
ATTORNEYS.

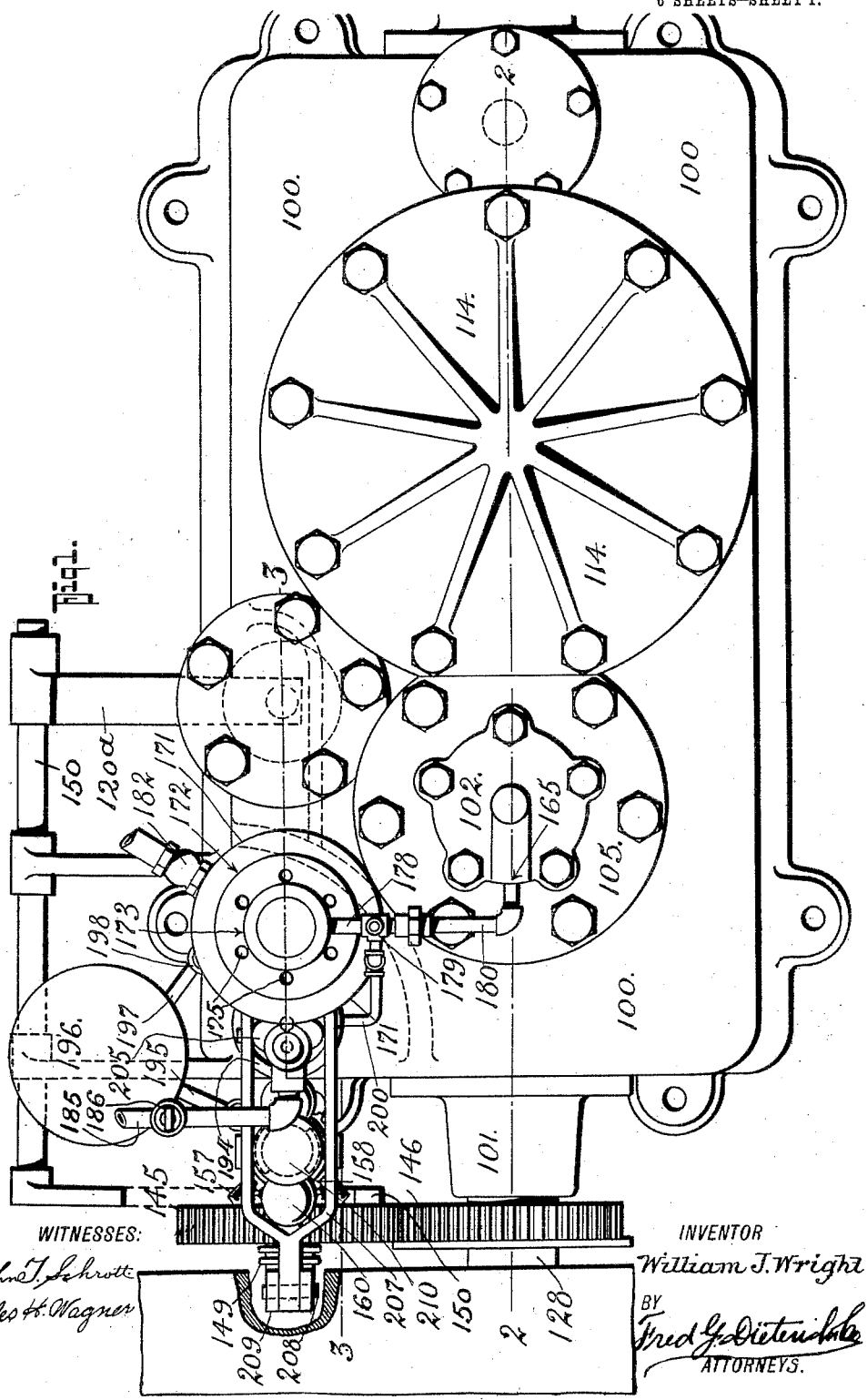

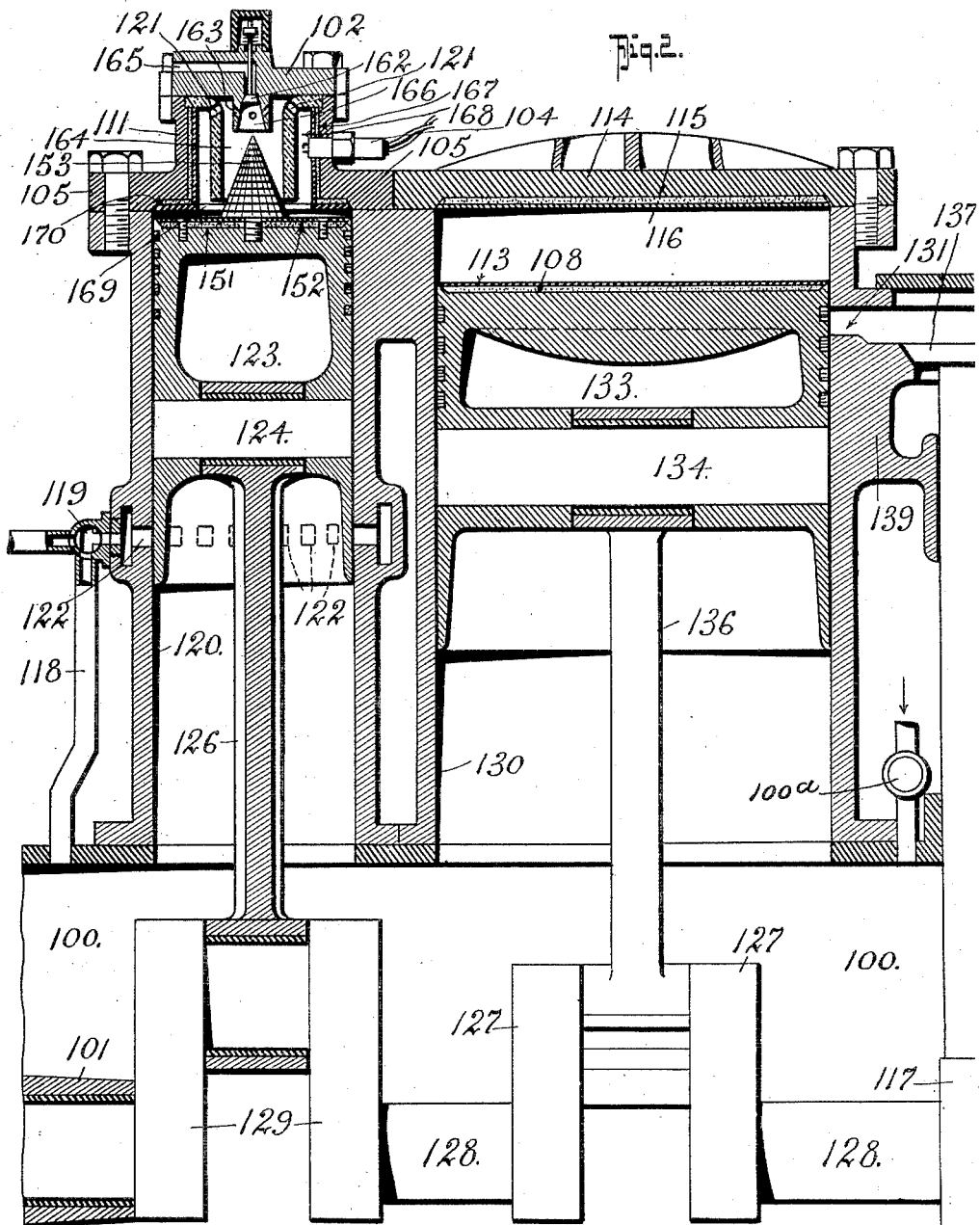

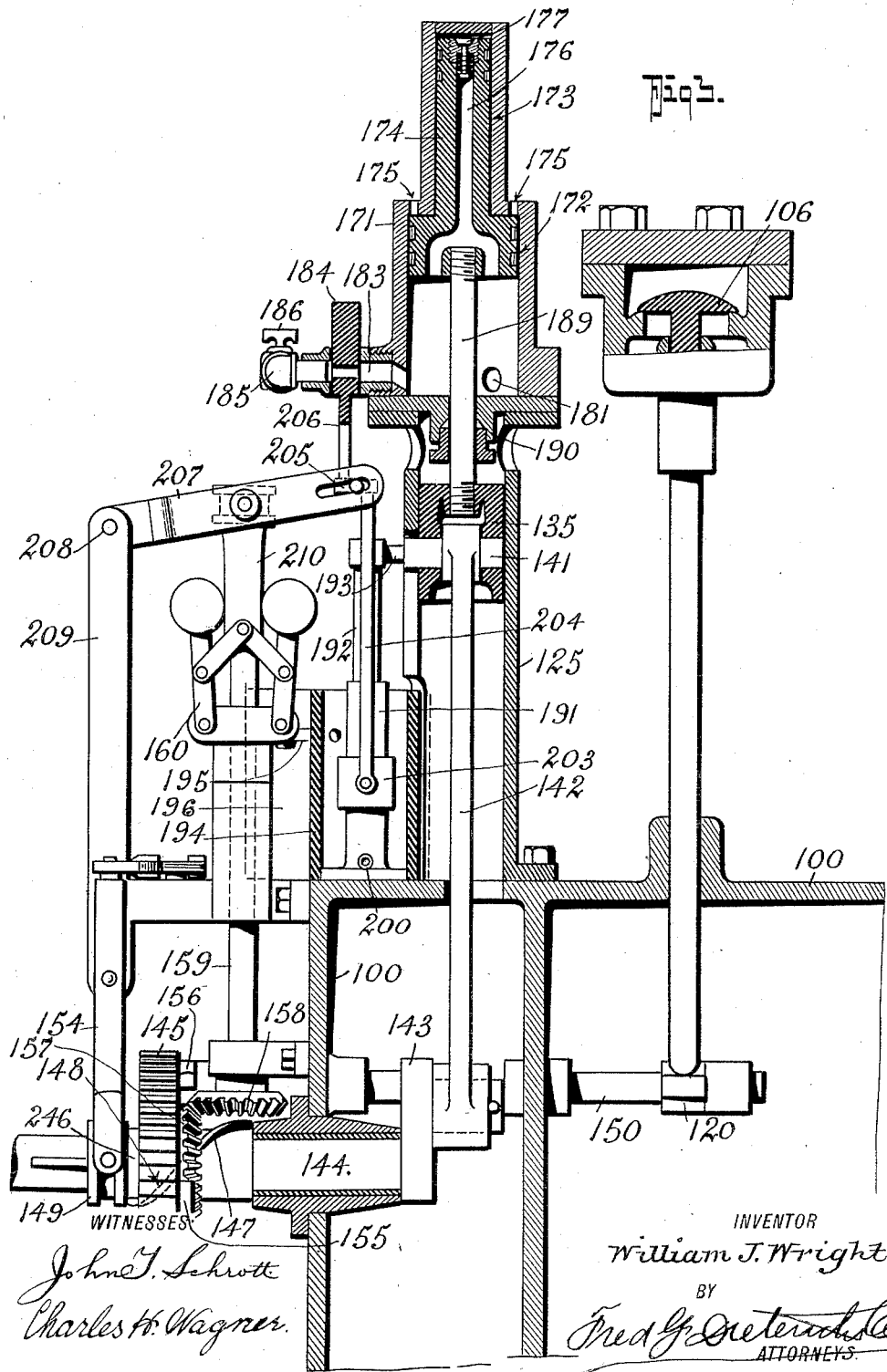

W. J. WRIGHT.
INTERNAL COMBUSTION ENGINE.
APPLICATION FILED JAN. 11, 1909.
1,076,854.
Patented Oct. 28, 1913.
6 SHEETS—SHEET 5.
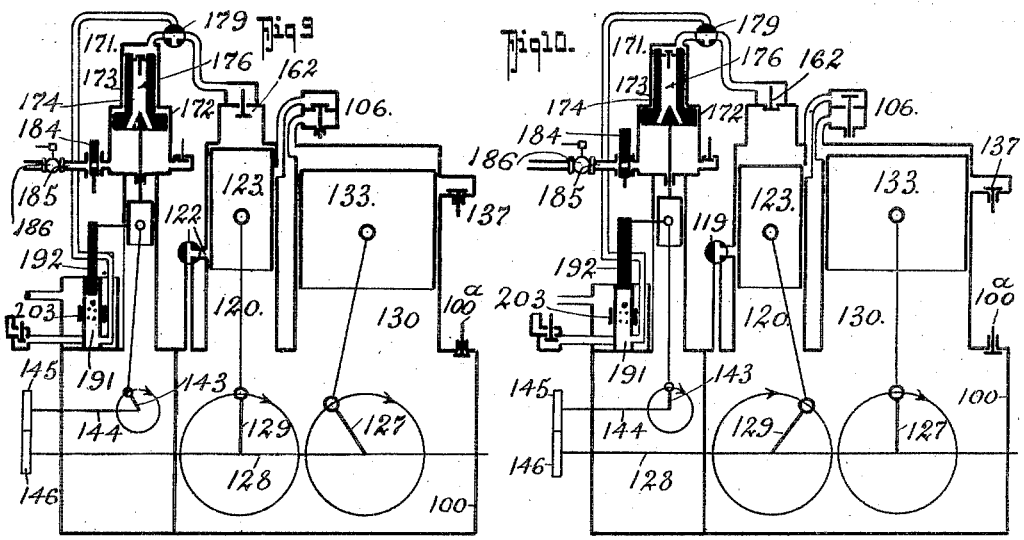
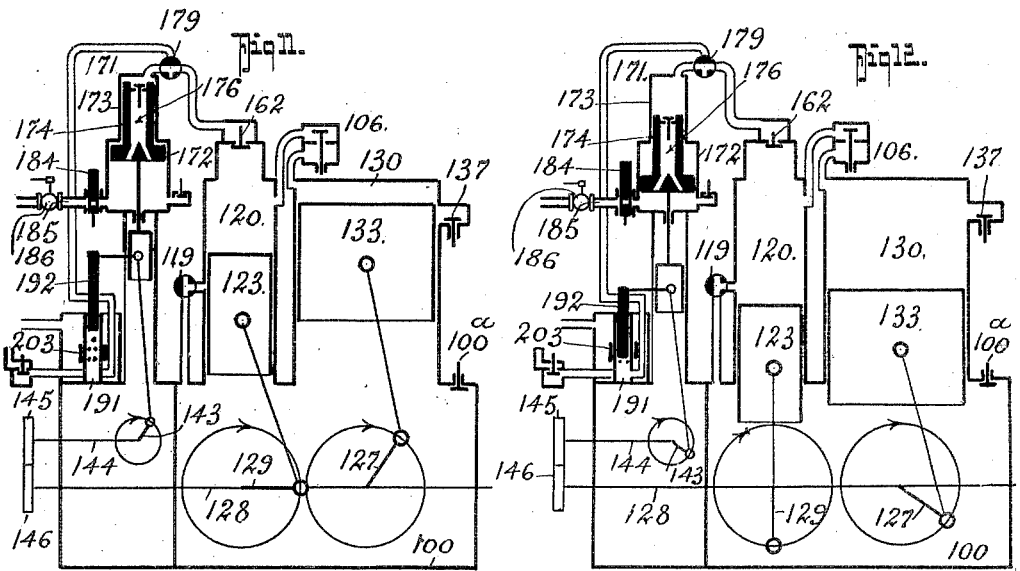
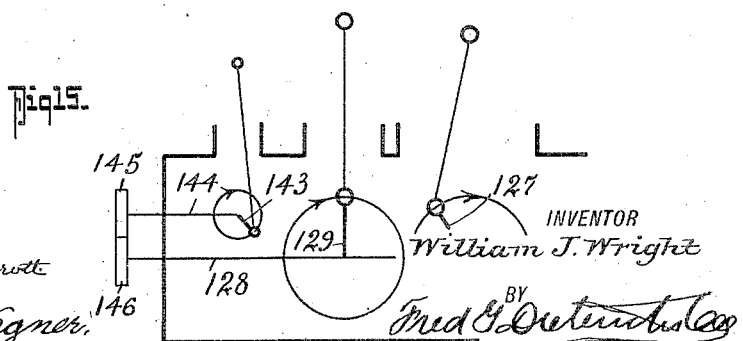
WITNESSES:
John T. Schrott
Charles H. Wagner
INVENTOR
William J. Wright
BY
Fred G. Dieterich
ATTORNEYS.

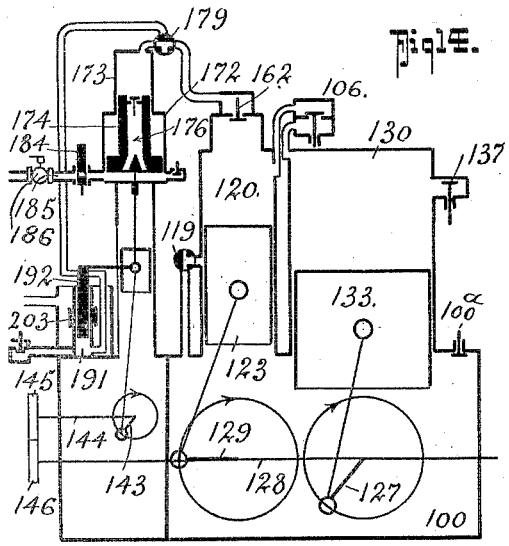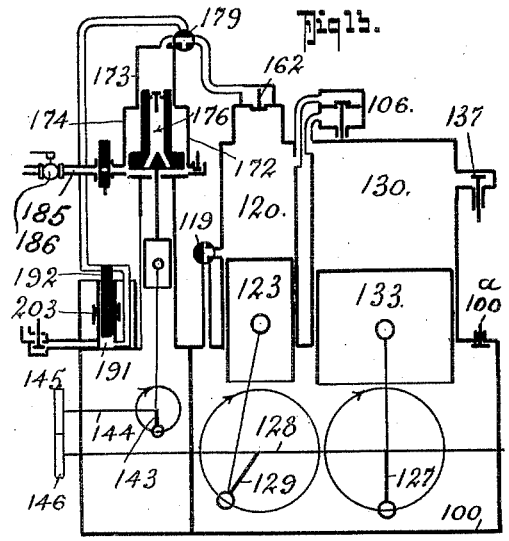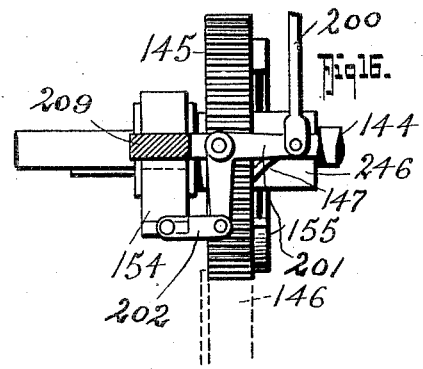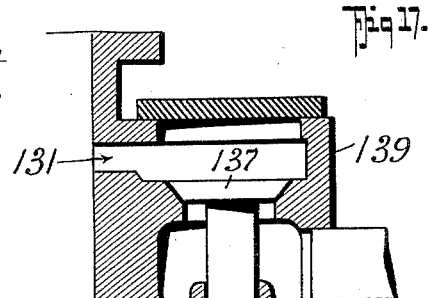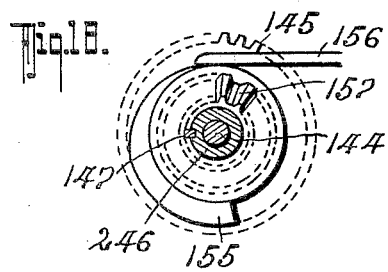

UNITED STATES PATENT OFFICE.

WILLIAM J. WRIGHT, OF FRANKLIN, PENNSYLVANIA, ASSIGNOR TO WRIGHT ENGINE COMPANY, OF PITTSBURGH, PENNSYLVANIA, A CORPORATION OF DELAWARE.

INTERNAL-COMBUSTION ENGINE.

1,076,854.         Specification of Letters Patent.         Patented Oct. 28, 1913.

Application filed January 11, 1909. Serial No. 471,554.

*To all whom it may concern:*

Be it known that I, WILLIAM J. WRIGHT, residing at Franklin, in the county of Venango and State of Pennsylvania, have invented certain new and useful Improvements in Internal-Combustion Engines, of which the following is a specification.

My invention is an internal combustion engine of the two-cycle compound type, designed to use either liquid or gaseous fuel, and in its generic nature the invention is an engine wherein means are provided for admitting and forming the working charge of agent in a high pressure or primary cylinder; and after igniting such charge to propel the working piston on its working stroke, a previously used burnt charge is admitted to the primary cylinder to add its energy to that of the newly burned charge, and means are provided for utilizing the energy of such combined charge to simultaneously act on a second piston in a low pressure or secondary cylinder to cause it to act in conjunction with the primary piston at times.

Another object is to provide means for admitting the burnable, explodable or explosive fuel into the primary cylinder under pressure and if desired, means are also provided for admitting the supporter of combustion into the cylinder under pressure.

Again my invention has for its object to provide pumps for pumping the liquid and gaseous fuel separately through a common port into the working end of the high pressure cylinder and to drive such pump by a single mechanism. A single governor is provided for automatically regulating the supply of either the liquid or gaseous fuel. Means are also provided for shifting the connection between the pump and a prime moving crank shaft whereby when such connections are in one position the liquid fuel pump will be operative and when in another position the gaseous fuel pump will be operative.

My invention also includes those novel details of construction, combination and arrangement of parts, all of which will be first fully described, specifically pointed out in the appended claims and illustrated in the accompanying drawings, in which:

Figure 1, is a top plan view of my engine, the fly wheels being broken away. Fig. 2, is a vertical section on the line 2—2 of Fig. 1. Fig. 3, is a similar view on the line 3—3 of Fig. 1. Fig. 4, is a horizontal section on the line 4—4 of Fig. 5. Fig. 5, is a vertical section on the line 5—5 of Fig. 4. Fig. 6, is an enlarged detail view of the liquid fuel pump and its governor sleeve. Fig. 7, is a horizontal section on the line 7—7 of Fig. 6, the reservoir or supply tank and its connection with the liquid fuel pump being indicated in dotted lines. Fig. 8, is a detail view illustrating a modification of my invention. Figs. 9 to 14 inclusive are diagrammatic views illustrating the operation of my invention, when gaseous fuel is used. Fig. 15, is a diagrammatic view showing the relative position of the several cranks when the liquid fuel pump is operated and the engine is operating on liquid fuel, the gaseous fuel pump being inoperative. Fig. 16, is an enlarged detail view of a means for shifting the pump crank from one position to another to throw one or the other pump out of operative position. Fig. 17, is a detail sectional view of the exhaust valve for the low pressure cylinder. Fig. 18, is a detail view of a part of the invention.

In the drawings, in which like letters and numerals of reference indicate like parts in all of the figures, 100 represents the crank case and bed having bearings 101 for the crank shaft 128. The crank shaft 128 has a crank 129 for the primary piston 123 and a second crank 127 for the secondary piston 133, the cranks being preferably set, in practice, forty degrees apart, although I do not wish to limit myself to this amount. The primary piston 123 has a pin 124 to receive the connecting rod 126 that joins the piston 123 with the crank 129. The piston 123 works in a primary cylinder 120, while the piston 133 works in a secondary cylinder 130 and has its pin 134 joined with the connecting rod 136 that is in turn joined to the crank 127. The cylinders 120 and 130 have ports 110—109 respectively, that communicate through the valve 106. The cylinder 120 has piston controlled air admission ports 122. The head 105 of the cylinder 120 has a tubular projection 111 to inclose a chamber whose upper end is closed by a cap 102 that has the combustible fuel admission port 165 and the depending exit bell 166 controlled by the valve 162 which is held closed by spring pressure. The passage past the valve 110

162 when open is such that the combustible substance will be admitted in the form of a tubular film so that it will suck air through the ports 163 in the bell 166 to mix the supporter of combustion with the combustible substance. Within the projection 111 a tube 164 of a vitreous material having apertures 121 is held to form a heat retaining ignition tube. The inner wall of the projection 111 is lined by a heat insulating sheathing or pad 167 that is held in place by a metallic tube 168 and the inner wall of the head 105 is likewise lined by a sheathing 170 held in place by a metallic plate 169. The piston 123 has its head dished to receive a heat insulating pad 151 and a retaining metallic plate 152 while the piston 123 is also provided with a vaporizing corrugated cone 153. A spark plug 104 serves as a means for starting the operation of the engine. The piston 133 has its head dished to receive a heat insulating pad 108 and a metallic plate 113, while the cylinder head 114 is dished to receive a pad 115 and a plate 116. The exit port 131 of the cylinder 130 communicates with the valve casing 139 of the exhaust valve 137 whose stem is operated by a cam 117 on the crank shaft 128. A pipe 118 leads from a three-way valve 119 to the crank case 100, the valve 119 also communicating with the air ports 122 and with the atmosphere.

125 represents a cross head bearing secured to the crank case 100 and in which a cross head 135 reciprocates. The cross head 135 has a pin 141 that passes through the connecting rod 142, that joins with a crank 143 on a countershaft 144 that is mounted in bearings in the crank case 100. The shaft 144 carries a gear 145 that meshes with a gear 146, on the crank shaft 128, the gear 145 being mounted on a sleeve 246 that is keyed to turn with the shaft 144 but is longitudinally movable thereon, the sleeve 246 having a spiral rib 147 to enter a groove 148 in the gear 145, and it is also provided with a collar 149 to engage a shifting lever 154 through the medium of which the sleeve 246 may be shifted to turn the shaft 144 with relation to the gear 145 through one-half circle, for a purpose presently apparent. A suitable shifting rod 200 is connected with the lever 154 by a bell crank 201 and link 202, as indicated. The lever 154 is pivoted to a depending portion 203 which forms a part of the fixed framing of the machine. The gear 145 carries a cam 155 that engages a lever 156 on the rock shaft 150, hereinbefore referred to. The gear 145 also carries a beveled gear 157 that meshes with a beveled gear 158 on the governor shaft 159 that carries the governor 160, hereinafter again referred to.

Mounted on the cross head bearing 125 is a gaseous fuel pump 171 whose casing is made of two diameters, 172—173. Within the pump casing is the pump piston 174 that is made of two diameters to correspond to the diameters of the casing sections 172—173, the casing section 172 having air ports 175 to prevent the formation of a vacuum. The piston 175 has a passage 176 from end to end controlled by a back check valve 177. A pipe 178 leads from the head of the casing section 173 to a three-way valve 179 that also communicates through a pipe 180 with the passage 165, in cap 102 of the cylinder head 105. The pump cylinder section 172 is provided with an air inlet port 181 in its lower end that admits air through a back check valve 182 for a purpose presently understood. The gaseous fuel pump 171 is also provided with a fuel intake port 183 controlled by a valve 184 connected through a pipe 185 with the source of gaseous fuel supply, the pipe 185 having a stop cock 186, as shown. The piston 174 is joined with a cross head 135 through a piston rod 189 that projects through a gland 190 in the lower wall of the pump casing.

191 represents the liquid fuel pump cylinder in which the piston 192 operates, the piston 192 being connected to the cross head 135 by a pin 193, so as to be operated therefrom. The liquid fuel pump 191 is surrounded by an overflow tank 194 from which an overflow pipe 195 leads to the fuel reservoir 196, see Fig. 1, and a pipe 197 connects through a back check valve 198 with a pipe 199 that enters the pump cylinder 191 at the bottom thereof.

200 represents the fuel discharge pipe from the pump cylinder 191, which communicates with the three-way valve 179, as shown more clearly in Fig. 1. The pump cylinder 191 is provided with apertures 201 beneath which a series of smaller apertures 202 are provided, the passage of the fluid through the apertures 202 being controllable by a sleeve 203 that is carried by rods 204 which join with a head 205 to which the stem 206 of the valve 184 also connects. The head 205 connects with the lever 207, pivoted at 208 to a bracket 209 and connected with the shiftable sleeve 210 of the governor 160, whereby the movement of the governor controls the operation of the valve 184 and the sleeve 203, it being understood that the sleeve 203 never closes the aperture 201.

In the modified construction disclosed in Fig. 8, I form a jacket 211 around the cylinder 120 to inclose a space 212 which communicates with the three-way valve 119, through a port 213 so that the atmospheric air may be led into the chamber 212 to assist in absorbing the heat from the cylinder 120, if desired, or the air from the crank case 100 may be partly shunted into the chamber 212 if desired.

The foregoing constitutes a general description of the mechanical construction of my invention and before going into a detailed description of the operation of my invention, I desire to define certain terms hereinafter used, to wit: 1st: When I speak of a fresh charge of combustible fuel or combustible agent, I mean either gaseous fuel or liquid fuel before it has been used in the engine. 2nd: When I speak of working agent, I mean the combined combustible substance and the supporter of combustion. 3rd: When I spreak of the primary burned working agent or reusable agent, I mean the fuel after it has been once burned and used. 4th: When I speak of the exhausted charge, I mean that part of the working agent charge after it has been finally used up and is ready to be discharged to atmosphere. 5th: When I speak of "an element of the working agent" I mean either the combustible substance or the supporter of combustion.

Bearing the foregoing definitions in mind, the operation of my invention will be made clear from the following.

Operation: Assume the parts to be positioned, as shown in Fig. 9, and the engine having gone through several cycles of operation to bring all the parts into their full working positions. Assume further that it is desired to run the engine on gaseous fuel. In that event the valve 179 will be turned to bring the pump 171 into communication with the cylinder 120, through the valve 162. A compressed charge of working agent will be burning in the working end of the cylinder 120, while a charge of previously burned reusable working agent is being compressed in the working end of the cylinder 130, the valve 106 being closed. The port 122 is also closed by the piston 123, the valve 184 is opened as is also the stop cock 186. The pump 171 is forcing gaseous fuel into the working end of the cylinder 120 where it is being burned. As the parts move from the position shown in Fig. 9, to the position shown in Fig. 10 the pump piston 174 will have completed its stroke and the valve 162 will be closed, the piston 123 will be moving under the expansive force of the burnt mixture in the working end of the cylinder 120 and the piston 123 just about ready to open the intercommunicating port between the two cylinders 120 and 130. In this position also the valve 106 is open and the compressed reusable charge is beginning to be forced into the working end of the cylinder 120 from the working end of the cylinder 130. In this position as well as when the parts are in the position shown in Fig. 9, the exhaust valve 137 will be closed. As the parts move from the position shown in Fig. 10 to that shown in Fig. 11, both pistons 123 and 133 will be moving under the force of the combined newly burnt mixture and old burnt mixture in cylinders 120 and 130, the valve 106 being still open when the parts are in the position shown in Fig. 11. When the parts are in the position shown in Fig. 11 the valve 162 is held close and the valve in the piston 174 is opened, it being understood that the valve in the piston 174 is open on the down stroke of the piston and closed on the up stroke. Now as the parts move from the position shown in Fig. 11 to the position shown in Fig. 12, the piston 133 will have commenced to draw the combined burned mixture from the cylinder 120 into the cylinder 130 and draw in air through the port 122, it being understood that when the port 122 is piped up to the crank casing the air in the crank casing is compressed by the pistons 123 and 133 and rushes into the cylinder 120. When the parts are in the position shown in Fig. 12, the valve 106 is open, the exhaust valve 137 closed and the valve 162 is closed. Now assume the parts to move from the position shown in Fig. 12 to that shown in Fig. 13, the piston 133 on the last forty degrees of its down stroke will draw the old mixture below the intercommunicating port out of the cylinder 120 into the cylinder 130 and at the same time permit air (the supporter of combustion) to enter the cylinder 120 to replace the withdrawn mixture. By this time the parts have reached the position shown in Fig. 13, the valve 106 will have closed, the exhaust valve 137 will be opened and the valve 162 will be closed. As the pistons continue their up-stroke the piston 123 will close the port 122 and compress the air within the cylinder 120, it being understood that the cylinder 120 will be compressing some old mixture in the projecting part of the cylinder head which was not withdrawn from the cylinder 120 by the piston 133 so as to maintain the ignition tube hot. As the piston 123 moves on its up-stroke the exhausted agent in the cylinder 130 between the exhaust port and the piston 133 will be exhausted through the valve 137 to atmosphere, the exhausting taking place when the parts move from the position shown in Fig. 13 to the position shown in Fig. 14 until the piston 133 has again closed the exhaust port 137. When the piston 123 is moving on its compression stroke and arrives within twenty degrees of the end of its compression stroke the valve 162 opens to admit the combustible charge into the working end of the cylinder 120 where it is immediately ignited and the admission of combustible charge continuing until the piston 123 has moved twenty degrees on its working stroke from the position shown in Fig. 9, to that shown in Fig. 10. When the parts are in the position shown in Fig. 14, the valve 162 is closed, the valve 106 is closed and the exhaust valve 137 is opened.

In order to operate my engine on liquid fuel it is only necessary to shift the sleeve to turn the shaft 180 deg. so as to bring the liquid fuel pump into operative relation to the primary and secondary cylinders as will be readily understood by reference to Figs. 3, 15, 16 and 18 of the drawings. It is necessary to shift the position of the cam 155 to 180° in changing from a gas operated engine to a liquid fuel operated engine and vice versa in order that the respective fuel pumps may be operated at the proper times as by the construction shown, unless the position of the cam be so shifted, the change from liquid fuel to gaseous fuel cannot be made with the pump pistons both operated from the common crank, as one is designed to discharge on the up stroke and the other is designed to discharge on the down stroke. As the engine speeds up the governor 160 draws down the member 207 which closes off the valve 184 and moves the sleeve 203 to uncover more of the holes 202 in the pump cylinder 19, thus gas flow, if the engine is being used with gas as a motive power, is cut off through the valve 184 proportionately to the speed. The oil flow, when the engine is being used with oil, instead of being all pumped through the pipe 200 will partly pass through the holes 202 on the down stroke of the piston and the piston 192 will suck in less oil through the pipe 199, thus controlling the oil feed.

It should of course be understood, that when the engine is operating by gaseous fuel the stop cock 186 is open to cut on the supply of fuel, and the supply of liquid fuel to the pump 191 is cut off so as to prevent liquid fuel entering the pump. When the engine is operating under liquid fuel, the stop cock 186 is shut, it being understood of course, that in shutting down the engine when running on liquid fuel, the supply of liquid fuel is shut off from the pump 191 by any suitable stop cock (not shown) or any other suitable way, and as soon as the supply of liquid fuel in the pump cylinder beneath the holes 202 has been exhausted, the engine will stop operating.

It will be noticed that as the combustible substance is admitted through the valve 162 the compressed supporter of combustion is thoroughly mixed with the combustible substance to insure as complete a burning of the combustible substance as possible and should any of the combustible substance remain unburned it will be reburned when returned to cylinder 120 from the cylinder 130. The provision of the metallic lining to the piston head and cylinder head separated by heat insulating material insures a sufficient retention of heat in the working end of the cylinder 120 to obtain the proper combustion of the working agent.

In the practical operation, my invention is designed to operate either on liquid or gaseous fuel, and in starting the engine it is preferable to start on gaseous fuel after which the parts may be shifted to operate on liquid fuel and thus make it unnecessary to use sparking devices except to start the engine. As the combustible substance passes through the valve 162 it will impact the cone 153 and it will also cause air to be sucked through the ports 163, the air mixing with the vaporized combustible substance that is vaporized as soon as it engages the cone 153, the cone by reason of its corrugations exposing a large heating surface to the incoming combustible substance. The air is also drawn through the ports 121 into the inside of the igniting tube 164.

The valve 186 in addition to being a stop cock, may also be a back check valve, or a separate back check valve may be employed in the pipes 185 for the usual purpose.

From the foregoing description, taken in connection with the accompanying drawings it is thought the complete construction, operation and numerous advantages of my invention will be readily understood by those skilled in the art to which the invention appertains.

What I claim is:

1. In an internal combustion engine, a primary cylinder and its piston, a secondary cylinder and its piston, a crank shaft with which said pistons are operatively connected to operate one in advance of the other, said high pressure cylinder having controlled air inlet ports, said cylinders having an intercommunicating duct connecting the same and a valve in said duct for controlling passage therethrough, said secondary cylinder having an exhaust port and a valve for controlling said exhaust port, a fuel pump for charging the primary cylinder with fuel, means operated from the crank shaft for actuating said fuel pump to supply fuel to said primary cylinder at a definite time during the cycle of operation of the primary piston, a valve gear for actuating said intercommunicating duct valve to throw the cylinders into communication during the common down stroke portion of the cycle of operations of said pistons and to hold said valve closed during a portion of the up strokes of said secondary piston, a valve gear for operating said exhaust valve to hold the same open during a predetermined part of the up stroke of the secondary piston and hold the same closed during the remaining part of said secondary piston up stroke, said pistons moving together in the same direction during a predetermined part of their up and down strokes, all being arranged that said secondary piston will operate as a suction pump piston during a part of its cycle of operation, as an exhausting piston during another part of its cycle of operation, as a compressing piston during a third part of its cycle of operation, and as a working piston during the remaining part of its cycle of operation.

2. An internal combustion engine that includes a primary cylinder and its piston, a secondary cylinder and its piston, a duct between said cylinders, a valve for controlling passage through said duct, a working agent inlet port for the primary cylinder and an air inlet port for the primary cylinder, an exhaust port for the secondary cylinder and an exhaust valve for controlling said exhaust port, a crank shaft having cranks set at an angle to one another, connecting rods between said pistons and said cranks, thereby causing one of said pistons to move in advance of the other, combined with a valve gear for operating said intercommunicating duct valve and another valve gear for operating said exhaust valve at predetermined intervals to cause said secondary piston to act as a pump piston for supplying the high pressure cylinder with a supporter of combustion through its air ports during a part of the cycle of operation of said secondary piston, and to cause said secondary piston during the next part of its cycle of operation to force a predetermined portion of said spent gases through said exhaust port and to compress the remainder in said secondary cylinder to be returned more or less to said primary cylinder, upon the opening of said intercommunicating duct valve, and further cause said secondary piston on the next succeeding portion of its cycle of operations to act as a working piston.

3. An internal combustion engine, a primary cylinder and its piston, a secondary cylinder and its piston, a crank shaft with which said pistons are connected to operate one in advance of the other, an intercommunicating duct between said cylinders, a valve in said duct for controlling the passage through the same, an exhaust port for said secondary cylinder, a valve for controlling said exhaust port, piston controlled air inlet ports for said primary cylinder, a valve gear for actuating said intercommunicating duct valve, and a valve gear for operating said exhaust valve, connections between said valve gear and said crank shaft to cause said valves to be opened and closed in time with the movements of said pistons to cause said secondary piston to act as a pump piston during one part of its cycle of operation for supplying a supporter of combustion to the primary cylinder through its air ports, and to act as an exhausting piston for forcing a spent charge through said exhaust valve during a further part of its cycle of operation, and a separate means for supplying a combustible agent to the primary cylinder at predetermined intervals.

4. An internal combustion engine, a primary cylinder and its piston, a secondary cylinder and its piston, a crank shaft with which said pistons are connected to operate one in advance of the other, an intercommunicating duct between said cylinders, a valve in said duct for controlling the passage through the same, an exhaust port for said secondary cylinder, a valve for controlling said exhaust port, piston controlled air inlet ports for said primary cylinder, a valve gear for actuating said intercommunicating duct valve, and a valve gear for operating said exhaust valve, connections between said valve gear and said crank shaft to cause said valves to be opened and closed in time with the movements of said pistons to cause said secondary piston to act as a pump piston during one part of its cycle of operation for supplying a supporter of combustion to the primary cylinder through its air ports and to act as an exhausting piston for forcing a spent charge through said exhaust valve during a further part of its cycle of operation, and to cause said secondary piston to compress a predetermined residual part of the contents of said secondary cylinder during a still further part of its cycle of operation and return some of said residual contents to the primary cylinder at times.

5. An internal combustion engine, a primary cylinder and its piston, a secondary cylinder and its piston, a crank shaft with which said pistons are connected to operate one in advance of the other, an intercommunicating duct between said cylinders, a valve in said duct for controlling the passage through the same, an exhaust port for said secondary cylinder, a valve for controlling said exhaust port, piston controller air inlet ports for said primary cylinder, a valve gear for actuating said intercommunicating port valve, and a valve gear for operating said exhaust valve, connections between said valve gear and said crank shaft to cause said valves to be opened and closed in time with the movements of said pistons to cause said secondary piston to act as a pump piston during one part of its cycle of operation for supplying a supporter of combustion to the primary cylinder through its air ports, and to act as an exhausting piston for forcing a spent charge through said exhaust port during a further part of its cycle of operation, and to cause said secondary piston to compress a predetermined residual part of the contents of said secondary cylinder during a still further part of its cycle of operation and return some of said residual contents to the primary cylinder at times, and to further cause said secondary piston to act as a working piston during the remaining parts of its cycle of operation.

6. In an engine of the character stated, a primary cylinder and a secondary cylinder and their pistons, a crank shaft and connections between said crank shaft and said pistons, an intercommunicating duct between said cylinders, a valve in said intercommunicating duct, an exhaust port for said secondary cylinder, a valve for said exhaust port, said pistons operating one in advance of the other, means for actuating said intercommunicating and exhaust valves through predetermined cycles with relation to the movement of said pistons to cause said secondary piston to act as a suction pump during one part of its cycle to evacuate the primary cylinder, and to act as an exhausting piston during a second part of its cycle of operation to exhaust a predetermined part of the contents of the secondary cylinder to atmosphere through said exhaust port, and to act as a force pump piston during a third part of its cycle of operation to return the remaining or residual part of the contents of said secondary cylinder back into said primary cylinder, and to act as a working piston during the remaining part of its cycle of operation.

7. In an engine of the character stated, a primary cylinder and a secondary cylinder and their pistons, a crank shaft and connection between said crank shaft and said pistons, an intercommunicating duct between said cylinders, a valve in said intercommunicating duct, an exhaust port for said secondary cylinder, a valve for said exhaust port, said pistons operating one in advance of the other, means for actuating said intercommunicating and exhaust valves through predetermined cycles with relation to the movement of said pistons to cause said secondary piston to act as a suction pump during one part of its cycle to evacuate the primary cylinder, and to act as an exhausting piston during a second part of its cycle of operation to exhaust a predetermined part of the contents of the secondary cylinder to atmosphere through said exhaust port, and to act as a force pump piston during a third part of its cycle of operation to return the remaining or residual part of the contents of said secondary cylinder back into said primary cylinder, and to act as a working piston during the remaining part of its cycle of operation, and means for separately admitting the combustible element and the supporter-of-combustion element of the working agent into the primary cylinder at predetermined intervals in the cycle of operation of said primary piston.

8. In a compound combustion engine, a primary cylinder and its piston, a secondary cylinder and its piston, means for admitting the combustible element of the working agent into the primary cylinder, and a separate means for admitting the supporter-of-combustion element of the working agent into the primary cylinder, means for controlling the entrance of one of said elements through its respective admitting means into the primary cylinder by the movement of said secondary piston during one part of its cycle of operation, means for permitting said secondary piston to exhaust a predetermined part of the contents of said secondary cylinder to atmosphere during a second part of its cycle of operation, said secondary piston operating to compress the remaining part of the contents of said secondary cylinder during a third part of its cycle of operation and returning the same in whole or in part to the primary cylinder, said entrance controlling means including a duct between the two cylinders and a valve in said duct, together with a valve actuating gear to open and close said valve at predetermined intervals.

9. Separate primary and secondary cylinders and their pistons, a common crank shaft for the pistons, connections between the pistons and the crank shaft, separate admission ports to the primary cylinder for the combustible and the supporter of combustion, means including an inter-communicating duct between said cylinders distinct from said admission ports coöperating with said pistons for controlling the admission through one of said admission ports, and means coöperating with said secondary piston for exhausting the spent charge to atmosphere means for closing said intercommunicating duct at times.

10. Primary and secondary cylinders and their pistons, a common crank shaft for the pistons, connections between the pistons and the crank shaft, separate admission ports to the primary cylinder for the combustible and the supporter of combustion, means for controlling the admission through one of said admission ports, a pump mechanism for controlling admission through the other admission port, said pump mechanism comprising separate pumps, one for gaseous fuel and one for liquid fuel, and a common operating mechanism for both pumps, and means for bringing either one of said pumps into operative relation with the primary and secondary cylinders and pistons, as desired.

11. Primary and secondary cylinders and their pistons, a common crank shaft for the pistons, connections between the pistons and the crank shaft, separate admission ports to the primary cylinder for the combustible and the supporter of combustion, means for controlling the admission through one of said admission ports, a pump mechanism for controlling admission through the other admission port, said pump mechanism comprising separate pumps, one for gaseous fuel and one for liquid fuel, a common operating mechanism for both pumps, means for bringing either one of said pumps into operative relation with the primary and secondary cylinders and pistons, as desired, and a unitary governing mechanism for governing the action of both of said pumps.

12. In a two-cycle internal combustion engine, a primary and a second cylinder having an intercommunicating port, pistons operating in said cylinders, a crank shaft to which said pistons are operatively connected, an exhaust port to the secondary cylinder, means including said secondary piston for drawing the spent working agent from the primary cylinder into the secondary cylinder while simultaneously admitting a fresh supporter of combustion, into the primary cylinder to be compressed by the primary piston on its compression stroke, and means for admitting a combustible into the primary cylinder during the compression stroke of the primary piston.

13. In a two-cycle internal combustion engine, a primary and a secondary cylinder having an intercommunicating port, pistons operating in said cylinders, a crank shaft to which said pistons are operatively connected, an exhaust port to the secondary cylinder, means including said secondary piston for drawing the spent working agent from the primary cylinder into the secondary cylinder while simultaneously admitting a fresh supporter of combustion, into the primary cylinder to be compressed by the primary piston on its compression stroke, and means for admitting a combustible into the primary cylinder during the compression stroke of the primary piston, and during a part of the working stroke of said piston.

14. In a two-cycle internal combustion engine, a primary and a secondary cylinder, an intercommunicating duct between said cylinders, pistons operating in said cylinders, a crank shaft to which said pistons are operatively connected to operate one in advance of the other, an exhaust port for the secondary cylinder, a valve in said intercommunicating duct, said primary cylinder having air admission ports, means for operating said intercommunicating valve to open the same at predetermined times to permit said secondary piston to draw the spent working agent from the primary cylinder into the secondary cylinder while simultaneously admitting a fresh supporter of combustion into the primary cylinder when said air ports are opened, said intercommunicating valve operating means including provisions for releasing said intercommunicating valve to permit the same to close as said primary piston moves on its compression stroke after closing said air ports, means for entering a combustible into the primary cylinder during the compression stroke of the primary piston, said intercommunicating valve operating means including provisions for opening said intercommunicating valve after said primary piston has completed its compression stroke to permit said secondary piston to force a part of the spent charge from the secondary cylinder into the primary cylinder as said primary piston begins its working stroke, said intercommunicating valve actuating means holding said valve open until said secondary piston has proceeded a predetermined distance on its working stroke.

15. In a two-cycle internal combustion engine, a primary and a secondary cylinder and their pistons, means for pumping one element of a working agent into the primary cylinder at times, other means for causing said secondary cylinder to act as a pump to supply the other element of the working agent to the primary cylinder during a portion of the stroke cycle of said secondary piston, and to exhaust the completely spent charge of working agent to atmosphere during another part of the stroke cycle of said secondary piston, and to inject a previously burnt charge of working agent into the primary cylinder at other times said last named means including an inlet port to said primary cylinder for the entrance of said other element of the working agent, a valved port connection between said cylinders, and a valved exhaust port from said secondary cylinder, together with a connection between said pistons.

16. In a two-cycle internal combustion engine, a primary and a secondary cylinder and their pistons, means for pumping one element of a working agent into the primary cylinder at times, and other means for causing said secondary cylinder to act as a pump to supply the other element of the working agent to the primary cylinder during a portion of the cycle of such secondary piston, and to exhaust the completely spent charge of working agent to atmosphere during another part of the cycle of said secondary piston, and to inject a previously burnt charge of working agent into the primary cylinder while ignition is occurring therein, said last named means including an inlet port to said primary cylinder for the entrance of said other element of the working agent, a valved port connection between said cylinders, and a valved exhaust port from said secondary cylinder, together with a connection between said pistons.

17. In a compound internal combustion engine of the character described, high and low pressure cylinders and their pistons, a common crank shaft to which said pistons are operatively connected to move one in advance of the other, an intercommunicating duct between said cylinders, a valve in said duct, an exhaust port for said secondary cylinder, and means for opening and closing said exhaust port at predetermined intervals, said primary cylinder having piston controlled air inlet ports, a crank case communicating with said cylinders below the pistons to form an air compression chamber, a valved inlet port connected to said crank case, a duct connecting said crank case with said primary cylinder air inlet ports, means for supplying a combustible to said primary cylinder, and a valve gear for actuating said intercommunicating valve to open the same as said primary piston opens said air ports to permit the contents of said primary cylinder to pass into said secondary cylinder and be replaced by air from said crank case, said valve gear having provisions to permit said intercommunicating valve to remain closed during the compression stroke of said primary piston and remain open during the working stroke of said secondary piston.

18. In a compound internal combustion engine of the character described, high and low pressure cylinders and their pistons, a common crank shaft to which said pistons are operatively connected to move one in advance of the other, an intercommunicating duct between said cylinders, a valve in said duct, an exhaust port for said secondard cylinder, and means for opening and closing said exhaust port at predetermined intervals, said primary cylinder having piston controlled air inlet ports, a crank case communicating with said cylinders below the pistons to form an air compression chamber, a valved inlet port connected to said crank case, a duct connecting said crank case with said primary cylinder air inlet ports, means for supplying a combustible to said primary cylinder, and a valve gear for actuating said intercommunicating valve to open the same as said primary piston opens said air ports to permit the contents of said primary cylinder to pass into said secondary cylinder and be replaced by air from said crank case, said valve gear having provisions to permit said intercommunicating valve to remain closed during the compression stroke of said primary piston and remain open during the working stroke of said secondary piston, said combustible admitting means including two fuel pumps and manually controlled means for bringing either of said pumps into operative relation to said pistons to pass fuel into the high pressure cylinder at predetermined times in the cycle of operation of said primary piston.

WM. J. WRIGHT.

Witnesses:
ALBERT E. DIETERICH,
JOHN T. SCHROTT.

---

Copies of this patent may be obtained for five cents each, by addressing the "Commissioner of Patents, Washington, D. C."